Oct. 13, 1970 S. A. MIXSELL ET AL 3,534,265

AUDIENCE SAMPLING SYSTEM

Filed Jan. 11, 1967 3 Sheets-Sheet 1

INVENTORS
STEPHEN A. MIXSELL
HANSEL B. MEAD

BY

LeBlanc and Shur
ATTORNEYS

Oct. 13, 1970 S. A. MIXSELL ET AL 3,534,265

AUDIENCE SAMPLING SYSTEM

Filed Jan. 11, 1967 3 Sheets-Sheet 2

INVENTORS
STEPHEN A. MIXSELL
HANSEL B. MEAD

BY

LeBlanc and Shur
ATTORNEYS

INVENTORS
STEPHEN A. MIXSELL
HANSEL B. MEAD

BY

LeBlanc and Shur
ATTORNEYS

United States Patent Office 3,534,265

Patented Oct. 13, 1970

3,534,265

AUDIENCE SAMPLING SYSTEM

Stephen A. Mixsell, Melbourne, and Hansel B. Mead, Eau Gallie, Fla., assignors, by mesne assignments, to Teltronic Measurement Systems, Inc., New York, N.Y., a corporation of Delaware Filed Jan. 11, 1967, Ser. No. 608,589
Int. Cl. H04b 1/00
U.S. Cl. 325—31 11 Claims

ABSTRACT OF THE DISCLOSURE

A radio and television audience survey monitor adapted to receive signals radiated to it from the local oscillators of listeners' sets and including noise rejection circuits in the form of filters, blanking circuits, counters, integrators, level detectors and a signal dump.

This invention relates to an electrical system useful for monitoring the listening habits of radio and television audiences and more particularly, is directed to an electronic survey device having improved features for eliminating interfering radiations. It is particularly suited for use with systems which rapidly obtain data on a large segment of listeners or viewers by sweeping an antenna over a metropolitan area and detecting signals generated in the radio and/or television receivers from the receiver local oscillators. While the system of the present invention will be described in conjunction with operation of the monitor from a tower or other edifice elevated above the surrounding buildings in the area to be monitored so as to reduce and minimize the obstructions in the radiation paths from the receivers to the monitor, it is equally adapted for use in an aircraft monitoring system of the type specifically disclosed in assignee's copending application Ser. No. 350,969, filed Mar. 11, 1964, now U.S. Pat. No. 3,299,355.

Commercial radio and television audience sampling and rating systems are well known such as the systems operated by Neilson and the American Research Bureau, the latter being perhaps better known as ARB With the increase in cost of advertising time on radio and television stations, and particularly the latter, sponsors have become more concerned with the scope of coverage afforded by advertising of this type. In recent years the television rating systems have received a great deal of publicity and are believed by many to have a direct effect on the life span of most continuing television programs.

A controversy has existed almost since the inception of the rating systems as to their reliability and accuracy. Of the many factors involved in any rating system, two of the most critized have been those involving the reaction factor and the sample size. The former of these two involves the question as to what effect the knowledge of the radio or TV listener that his set is being monitored has on his listening habits and whether or not there is any significant tendency on the part of such user to watch more of the so-called "high class" programs than he might actually otherwise prefer. This factor is substantially non-existent in completely passive systems such as local oscillator radiation systems where the radio or TV listener does not know that is set is being monitored. However, in the diary systems, those involving personal or telephone interviews, and those wherein permanent electrical connections are made, it may very well be an important factor effecting the listening habits of viewers.

The more recent "instantaneous" systems utilizing more or less permanent telephone connections to a specially selected sample of the population in a given locality eliminate much of the time delay evidenced by the diary type systems and furthermore constitutes an improvement in the reaction factor as opposed to the earlier systems, since with the permanent wire connection, there is a tendency on the part of the user to at least occasionally actually forget that his set is being monitored. However, a serious disadvantage of this type of system is the expense of inserting special transmitters and wiring up more than only a limited number of sets. Although it is alleged that much useful information can be gathered based upon a statistically accurate sample of only a very few sets, the statistical work and analysis involved in preparing such a sample is expensive and time consuming. Furthermore, the refusal of even one listener to have his set monitored may completely disrupt the accuracy of a technical sample as does the move of one or more listeners in a sample to a different city or even to a different location in the sample area.

In assignee's copending application Ser. No. 350,969, filed Mar. 11, 1964, now U.S. Pat No. 3,299,355 there is disclosed a novel radiation monitor type audience sampling system which avoids many of the above-mentioned difficulties by providing a passive system which rapidly gathers large quantities of information so that the number of sets surveyed is truly representative of the overall listening habits of an entire community being monitored. The system of that application involves monitoring a signal radiated from the television or radio set to an elevated location above the buildings in the area of the set users so as to minimize interference. In the preferred embodiment, the survey system of that application takes the form of a method wherein local oscillator signals are detected by a monitor carried in an aircraft flown over a metropolitan area.

The present invention is directed to an improved electronic system for sensing signals radiated from listener radio and television sets, and while suitable for use in an aircraft type sampling system, will be described specifically in conjunction with its use in a system in which the monitor is mounted on a tower or other structure so as to be elevated above local or adjacent buildings to provide a substantially free interference path to the sets in the community to be monitored. The device of the present invention is particularly adapted to an arrangement in which the monitor is connected to a directive antenna, the radiation pattern of which is periodically swept over or otherwise caused to scan a metropolitan area to be monitored so that the antenna picks up radiation from the listeners' sets, preferably in the form of signals generated in the sets by their local oscillators. Important features of the present invention include the provision in the electronic circuitry for eliminating undesired interference, such as automotive ignition noise, aircraft ignition noise, and interfering FM as well as other commercial and industrial communication interference. The electronic circuit of this invention is quite sensitive and is capable of dstinguishing between local oscillator signals differing in frequency by as little as 100 cycles.

Although useful in aircraft survey systems, the device of the present invention incorporates as an important feature an electronic arrangement for minimizing automotive ignition interference which tends to be more of a problem with tower mounted units than it is in systems where the monitor is mounted in an aircraft. To this end, the receiver or monitor of the present invention is provided with a novel integration and level detector circuit which acts on a time principle to distinguish between desired signals and unwanted noise such as bursts of automotive ignition interference. That is, the system is constructed so that the desired pulses occur for a longer interval of time and the circuit distinguishes between these desired long pulses and the shorter pulses from automotive ignition systems. Also incorporated in the system of the present invention is a novel blanking circuit including a special blanking counter for eliminating predetermined interference transmissions such as those occurring from known FM stations which transmit quite accurately at predetermined frequencies. Circuits are provided for permitting the system to rapidly recover from the blanked condition so that a minimum of desired information is lost due to interference. Because of the large quantities of data collected as compared to prior audience sampling systems, the accuracy of the count obtained is quite high.

It is therefore one object of the present invention to provide an improved electronic monitor for audience sampling or survey systems.

Another object of the present invention is to provide an audience sampling system having improved circuitry useful both in aircraft systems but especially in tower mounted units elevated above adjacent buildings to obtain direct line of sight paths from television and radio receiving sets to the monitor antennas.

Another object of the present invention is to provide a monitor sensitive to signals generated by the local oscillators of radio and television receiving sets which incorporates an improved arrangement for avoiding false counts from interfering signals and especially automotive ignition interference.

Another object of the present invention is to provide an audience sampling system monitor for incorporation in an aircraft or tower having improved blanking circuits for eliminating known interference. As part of the blanking system, the monitor incorporates a level detection and integration circuit which rapidly acts to temporarily disable the receiver upon receipt of interference, prevents saturation of the later stages of the monitor, and permits rapid recovery of the system so that a minimum of useful information is lost during the blanking period.

These and further objects and advantages of the invention will be more apparent upon reference to the following specification, claims and appended drawings, wherein:

For several years, attempts have been made to design and develop electronic systems which could be used to generate accurate television ratings. Each system has been unsuccessful due to inadequate solutions to various technical problems. The most serious of these problems have been (a) the sampling rate has been too slow and/or cost per sample too high to be practical, (b) FM interference has caused saturation of equipment and/or false data counts, (c) ignition noise has caused saturation of the equipment and/or false data counts, and (d) intermittent communications from various sources other than those mentioned above have saturated the equipment and/or resulted in false counts. The system of the present invention provide novel circuitry which solves all of the above problems.

While the monitor of the present invention is suitable for use in aircraft monitoring systems of the type disclosed in assignee's copending application Ser. No. 350,969, filed Mar. 11, 1964, now U.S. Pat. No. 3,299,355, it is particularly adapted to and will be described in conjunction with a television audit tower wherein the monitor's receiving antennas are mounted at a height elevated above the buildings in the area to be monitored so as to obtain a direct line of sight radiation path to communications receivers in the area with a minimum of interference and/or reflection. The TV audit tower system of the present invention preferably employs separate antennas for each TV channel being monitored. The antennas are rotated continuously through a slaved synchro system. The synchro is slaved to the electronic scan or swept frequency rate such that all antennas rotate one beam width while the electronics is swept once through its frequency spectrum. The position of the antennas is monitored in real time so that the area being monitored is known at all times.

The antennas of the monitor feed their signals to the electronic circuitry of the monitor through splitters and pre-amplifiers which are located on the TV audit tower. This enables high-signal-to-noise ratio and compensates for the loss in cabling between the antennas and the electronics.

Figure 1:
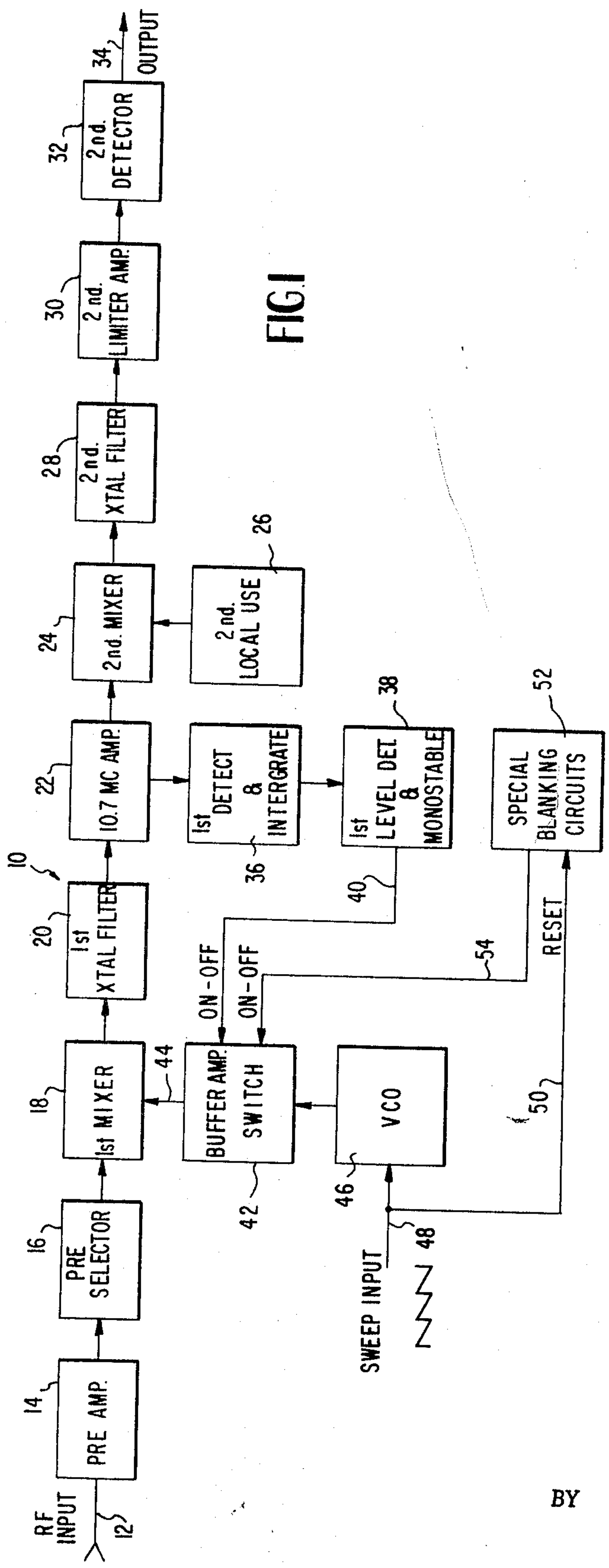
FIG. 1 is a block diagram of one channel of the novel monitor of the present invention.

Referring to FIG. 1, there is shown a portion of the TV monitor of the present invention generally indicated at 10 corresponding to a single channel, that is corresponding to that portion of the monitor electronics provided for obtaining the count of the number of television sets tuned to a particular broadcasting station. It is understood that the monitor includes a plurality of channels, all identical to the channel illustrated in FIG. 1 with the exception that the portion of each channel ahead of the first mixer is tuned to a different frequency band corresponding to the particular station broadcast frequency for which that channel is provided.

Signals received from TV local oscillators are normally in the −100 dbm to −120 dbm power range. Unfortunately, other and often more powerful signals are also found in the same frequency band as the desired local oscillator signals. These unwanted signals are generated from FM stations, aircraft, governmental communication systems, and other sources. The FM station interference is readily handled by the special blanking circuits descrbied below and are distinguished by the fact that they are on at known times and at a certain frequency. However, signals from other sources may be on intermittently and at frequencies unknown in advance. Therefore, it becomes necessary to provide an arrangement for keeping the necessarily high gain electronic system from saturating and for inhibiting false counts from these sources of interference.

In FIG. 1, the channel comprises an input lead 12 connected to an antenna (not shown) for receiving local oscillator signals in a certain frequency band indicative of a broadcasting television station. That is, all television receiving sets tuned to a particular station or channel will have local oscillators operating at closely related frequencies all of which are passed by way of lead 12 to a preamplifier 14 of conventional construction. The antenna for the channel shown along with the antennas for other channels are mounted on the tower and swept over the area to be monitored in the manner previously described. All channels are the same with the exception that the antenna, preamplifier 14, and preselector 16 of each channel is tuned to its own particular frequency band. For example, if listeners in the local area have a choice of four television stations, then four channels similar to the channel shown are provided in the monitor 10. From the preselector 16, the input signal is supplied to a first mixer 18 where the signal is beat down to a common intermediate frequency and the resulting IF signal passes through a first crystal filter 20. From the first crystal filter the IF signal passes through a 10.7 megacycle amplifier 22 to a second mixer 24 to modify the IF carrier for a purpose more fully explained below. The second mixer receives an input from a second local oscillator 26 and feeds from its output a signal to a second crystal filter 28. From the second crystal filter, the signal passes through a second limiter amplifier 30 and a second detector 32 to produce an output pulse on output lead 34. The output pulses are supplied to a conventional counter (not shown) coupled to lead 34 which counts the pulses supplied to it to indicate the number of local oscillators operating in the frequency band passed by the preamplifier 14 and preselector 16.

Connected to the 10.7 mc. amplifier 22 is a first detector and integration circuit 36 which feeds a first level detector and monostable circuit 38. The output from the monostable portion of circuit 38 passes by way of lead 40 to a buffer amplifier switch 42 whose output is coupled by way of lead 44 to the first mixer 18. Switch 42 acts to periodically shut off the signal supplied to the first mixer 18 from a voltage controlled oscillator 46 which is electronically swept in synchronism with the movement of the antenna coupled to input lead 12. That is, voltage controlled oscillator 46 sweeps through one complete cycle of its output band of frequencies during the time that the antenna coupled to input lead 12 rotates through one complete beam width of its radiation pattern. Oscillator 46 receives a synchronized sweep signal from input lead 48 which sweep signal is also supplied by way of lead 50 to a special blanking circuit 52. This blanking circuit supplies an output signal via lead 54 to the buffer amplifier switch 42 for also controlling operation of the switch to blank the monitor channel at predetermined intervals corresponding to the time that the voltage controlled oscillator is sweeping through a known interference frequency such as the frequency resulting from an interfering FM station.

As previously mentioned, the operation of each channel is identical, the only difference being that different frequencies are passed through to the first mixer 18. The voltage controlled oscillator 46 forming the rating system first local oscillator is electronically tuned (sweep oscillator) at a nominal 4 mc. This oscillator mixes in the first mixer 18 with the received TV local oscillator frequencies to form 10.7 mc. The 4 mc. sweep covers the bandspread of frequnecies normally occupied by TV local oscillators.

The mixer is followed by a 10.7 mc. crystal filter 20 which has a nominal 100 kc. bandwidth. A crystal filter is used for its good skirt selectivity which rejects large signals not far out of its passband. The output of the crystal filter is amplified at 22, detected, and limited in circuit 36 and level detector 38. The first level detector 38, is set such that any signal greater than the strongest expected signal from a TV local oscillator will cause the first level detector to fire. This triggers a monostable in circuit 38 which actuates switch 42 to turn off so as to interrupt the signal from voltage controlled oscillator 46 to the first mixer 18 for a predetermined time.

Figure 2:
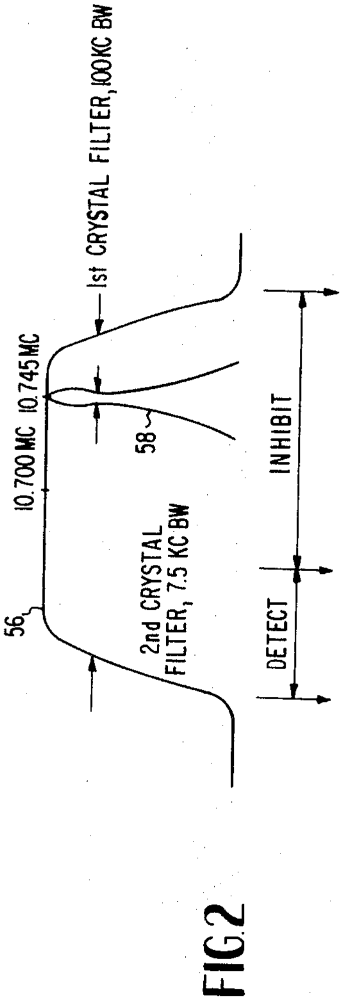
FIG. 2 is a diagram showing the relationship between the band widths of the crystal filters incorporated in the monitor of FIG. 1.

Second crystal filter 28 has a bandwidth of 7.5 kc. as compared with the bandwidth of the first crystal filter 20 whose bandwidth is 100 kc. The bandwidths of these two filters are illustrated in FIG. 2 with the passband of filter 20 being illustrated by the curve 56 centered at 10.700 mc. and the pass band of crystal filter 28 shown by the curve 58 centered at 10.745 mc. The passbands of the filters are measured at the ½ power points, as illustrated by the arrows.

Level detection in the first level detector 38 occurs fairly promptly as a signal enters the passband of crystal filter 20 and this is indicated in the area labeled "detect" in FIG. 2. At the end of this period, if the incoming signal is higher than any expected local oscillator signal, the monostable 38 operates to shut off buffer amplifier switch 42. During the remainder of this signal, as it passes through the pass band of first crystal filter 20, the circuit is inhibited and this is indicated by the "inhibit" area labeled in FIG. 2. Since the inhibit time overlaps the time at which the incoming signal crosses the frequency of the pass band of filter 28 as represented by the curve 58 in FIG. 2, the buffer amplifier switch is turned off at this time, and no signal is present at the second detector and therefore no false count is made. All circuits following the first mixer use this inhibit time to recover from the saturated condition.

Of course, no television sets can be counted during this inhibit time so it may be desirable to record when and where the first level detector is fired. When the level detector fires intermittently due to an intermittent interfering signal, the data from that sweep can be disregarded. When the first level detector fires frequently, requiring too much data to otherwise be lost, much data can be recovered since the distribution of TV sets within the spectrum of the particular TV channel is known and it is a simple matter to determine the probable number of TV sets lost in a particular frequency range.

Figures 3, 4:
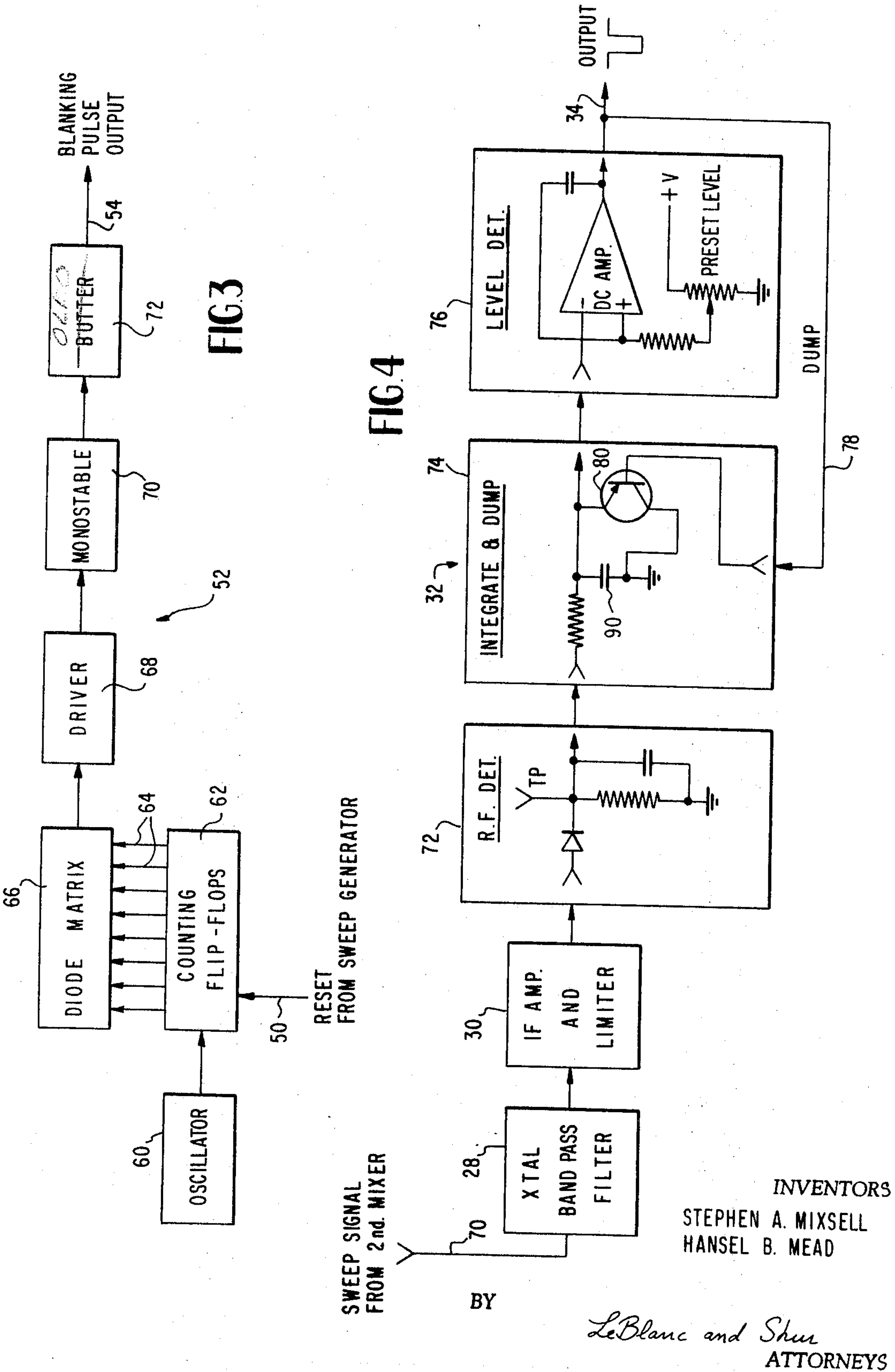
FIG. 3 is a block diagram of the special blanking circuits incorporated in the circuit of FIG. 1 for eliminating strong interfering singals within the frequency band being monitored.
FIG. 4 is a more detailed block diagram of the filter detector portion of the monitor of FIG. 1.

FIG. 3 is a more detailed block diagram of the special blanking circuit 52 of FIG. 1. This circuit is required when strong interfering signals are within frequency band being monitored. This circuit comprises an oscillator 60 feeding its output to a plurality of counting flip flops 62. Also fed into the counting flip flops is the reset signal from the sweep input by way of lead 50. The flip flops supply an output over one of the leads 64 to a diode matrix 66 in turn feeding a driver 68, monostable 70, and buffer amplifier 72. The blanking output pulse appears on output lead 54 illustrated in FIGS. 1 and 3.

Oscillator 60 is a free running oscillator used to trigger the count-down string of flip flops 62. The flip flops are reset by the start of the saw tooth on lead 50 from the sweep generator. By using ten count down flip flops, a count down of 1,024 is obtained. Diode matrix 66 is programmable by switches enabling the selection of any number of time slots within the 1,024 time slots available. Since the electronic sweep scans 4,000,000 cycles, dividing this by 1,024 means one time slot corresponds to about 3,900 cycles in the electronic sweep or scan. The matrix is simply programmed to the time slot corresponding to the particular frequency which is to be inhibited or blanked. The matrix output pulses trigger monostable 70 through driver 68. The monostable pulse width is adjusted to correspond to the frequency band width which is to be inhibited. The blanking pulse output on lead 54 acts to turn off the buffer amplifier switch 42 in FIG. 1.

The system so far described may be used in an airborne TV audit system or in a ground tower antenna arrangement. However, in the latter case, increased noise has been experienced particularly due to the pick up from automobile ignition while operating somewhat closer to ground level. Fortunately, the interfering noise caused by ignition systems comes in bursts and is not steady state. Most bursts last from a period of from 0.1 millisecond to 3 milliseconds. The repetition rate of course, varies as a function of motor r.p.m. and the number of cylinders in the automotive engine.

On the other hand, the re-radiated signals from TV local oscillators are constantly present. By suitable adjustment of the electronic scan rate, the signals from the TV set local oscillator can be made to be present for a period of at least 10 milliseconds. In simple terms, the new detecting device of this invention is made, to count signals which remain present for a period of 7 milliseconds, but ignore all signals which are present for less than 7 milliseconds. This circuit comprises the second crystal filter 28, second limiter amplifier 30, and second detector 32 in FIG. 1 which are more fully disclosed in FIG. 4. The sweep signal from the second mixer 24 in FIG. 1 is fed by way of lead 70 to the crystal band pass filter 28. This allows the achievement of as near a rectangular wave form as possible, thereby giving the best resolution in separating close frequency signals. The output from the crystal filter is amplified and amplitude limited in circuit 30 thereby producing the waveforms illustrated in FIG. 5.

From amplifier and limiter 30 the signal passes to the second detector 32 generally indicated in FIG. 4 as comprising RF detector 72, integrator and dump circuit 74, and level detector 76. A dump signal is fed back from the output of the level detector 76 by way of lead 78 to the base of transistor 80 in circuit 74. By adjusting the rate of frequency scan or sweep, the corresponding detector output for a detected TV local oscillator signal can be made to be 10 milliseconds while a typical pulse caused by ignition noise will be one to two milliseconds. The integrator begins to charge upon receipt of the limited output from the RF detector 72. Level detector 76 is adjusted to fire at the level corresponding to the integrator charge level under charge for 7 milliseconds. Upon firing the level detector feeds back a signal over lead 78 which dumps (or discharges) the integrator and a one millisecond pulse is generated on the output lead 34 which triggers a counter. After dumping, the integrator begins to charge again for about 2 milliseconds, or until the end of the local oscillator drive pulse. Since ignition noise is typically one to two milliseconds in duration, the integrator has insufficient time to charge up to the voltage required to fire the level detector and no count pulses are generated.

Figure 5:
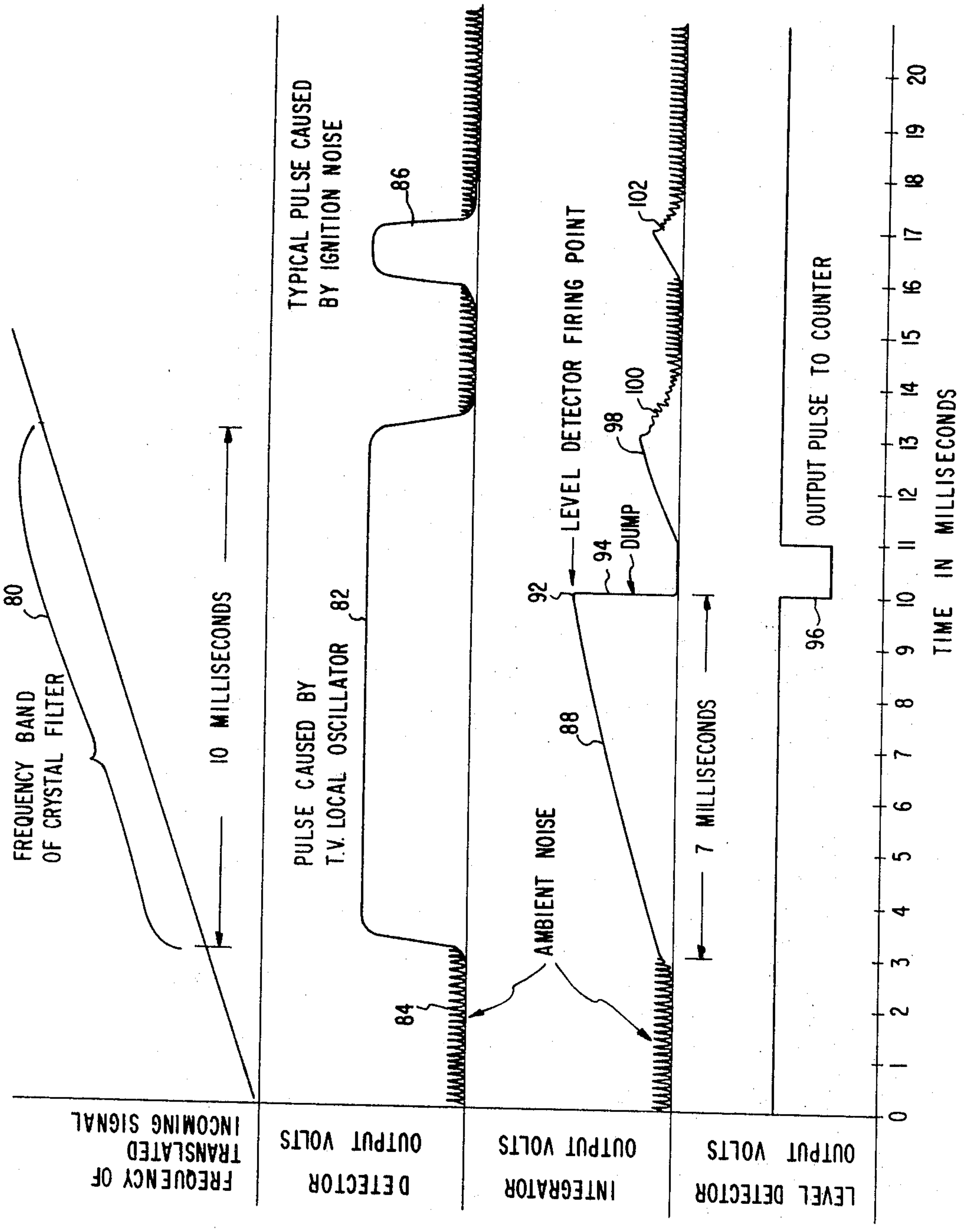
FIG. 5 shows the wave forms and pulse time relationships for the filter-detector portion of the circuit illustrated in FIG. 4.

This description of operation is verified by the pulse timing and waveform diagrams appearing in FIG. 5. In that figure, the frequency band of the crystal filter 28 is illustrated at 80 where the frequency of the translated incoming signal is ploted as a function of time in milliseconds. The pulse caused by the TV local oscillator as illustrated at 82 in FIG. 5 as superimposed upon ambient noise 84 and a typical pulse caused by ignition noise is illustrated at 86. The integrator output in volts is illustrated at 88. Capacitor 90 in FIG. 4 charges linearly to the point 92 in FIG. 5 at which time the level detector 76 fires and feeds back a pulse by way of dump lead 78 to dump the charge or discharge capacitor 90. This is illustrated by the steep vertical trailing portion of the wave in FIG. 5 at 94. After about 1 millisecond, i.e., the duration of output pulse 96, the capacitor begins again to charge because the TV pulse 82 is still present. This charge is illustrated at 98 in FIG. 5, but the capacitor does not charge sufficiently to fire the level detector and when the TV pulse disappears, the capacitor 90 gradually discharges as at 100 in FIG. 5. The voltage produced by the charge across capacitor 90 resulting from a typical ignition noise pulse is illustrated at 102. Because of the short duration of this ignition pulse, the capacitor does not charge suffiicently to fire level detector 76 and no output pulse is generated by the ignition noise pulse 86.

It is apparent from the above, that the present invention provides novel electronic circuitry for incorporation in the monitor of an audience survey system capable of minimizing deleterious effects resulting from all types of undesired interference. While the system has been described particularly for use in conjunction with operation from an elevated tower, it also is useful in airborne system similarly provided to collect large amounts of data in a short time by means of a substantially direct line of sight transmission path from a plurality of listening sets to the monitor antennas. Similarly, while only a single channel of a monitor has been specifically shown and described, it is understood that separate channels and where necessary, separate antennas are provided for each of the television stations to be covered by the survey. In all instances, the channels of the monitor 10 are identical to the channel specifically described, with the exception that the preamplifier 14 and preselector 16 of each of the individual channels is set to a different band of frequencies, i.e., the band of frequencies containing the local oscillator signals emanating from sets tuned to a particular TV station or TV channel. Where the transmitting sttations may vary widely in transmitting frequency, such as where the monitor may include both VHF and UHF stations, it may be desirable to have differently designed antennas for each of the channels, but these may be of conventional construction in accordance with the particular frequency band of operation. The local oscillator signals may be either above or below the frequency of the transmitting station, but in the United States most sets operate at a standard intermediate frequency so that the approximate deviation of the local oscillator from the transmitting frequency is readily ascertained in advance. Although all local oscillators of the sets tuned to a specific television station fall into the same frequency band, in most of the sets the local oscillators will not be operating at the exact same frequency but will be spread over a band of many thousands of cycles so that the individual sets can be isolated by the sweep system of this disclosure. The rapid sweep rate permits the separation of local oscillators differing by as little as 100 cycles or less so that a large count including most of the operating sets can be obtained. While the device of the present invention is admittedly not 100% accurate, it is believed that the setting of a minimum of approximately 85% of all the operating sets in a given local area can be readily detected by the system of this disclosure. This high percentage coupled with the very large number of sets which can be monitored in a short time makes the overall result of the count highly accurate and completely independent of the small and very selective sampling techniques previously employed.

Important features of the present invention include not only a rapid sweep rate for high sensitivity, but also include the novel blanking and filter circuits of the present invention which reject automotive ignition noise, aircraft ignition noise, and other interfering communications including predetermined broadcasts such as those produced by FM stations, commercial, military, and federal communications, and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a monitor for surveying the listening habits of radio and television receiver users, including a channel for each transmitting station covered by the survey, said channel passing a separate band of frequencies corresponding to the receivers tuned to a particular one of said stations, the improvement comprising means coupled to said channel for disabling said channel to any one of at least three types of interference signals, namely signals above a predetermined amplitude, signals occurring at a predetermined frequency, and burst signals which last for less than a predetermined length of time, said amplitude disabling means comprising a level detector coupled to said channel for sensing signals in said channel above a predetermined amplitude, a switch coupled to said channel and responsive to the output of said level detector for disabling said channel, said frequency disabling means comprising means including a digital counting chain coupled to said switch for activating said switch at a predetermined time after said chain starts counting, means for supplying a start of count signal to said chain at predetermined intervals, said burst signal disabling means comprising an integrator in said channel, and dump means coupled to said integrator for dumping signals from said integrator of less than said predetermined length of time.

2. Apparatus according to claim 1 including a mixer in said channel for changing the frequency of signals passing through said channel, a sweep oscillator having its output coupled to said mixer, said switch acting to uncouple said oscillator from said mixer.

3. Apparatus according to claim 2 including first and second filters in said channel, said second filter having a narrower pass band than said first filter and falling within the pass band of said first filter, said level detector being coupled to the output of said mixer through said first filter.

4. Apparatus according to claim 3 including a sweep oscillator coupled to said channel and means for applying a synchronizing signal to both said oscillator and said counting chain whereby said chain counts in synchronism with the sweep of said oscillator.

5. Apparatus according to claim 4 wherein said counting chain comprises a series of counting flip-flops feeding a diode matrix.

6. Apparatus according to claim 1 including a sweep oscillator coupled to said channel for heterodyning signals suplied to said channel, first and second band pass filters in said channel, said second filter passing only a portion of the signals passed by said first filter, said level detector being coupled to the output of said first filter for disabling said oscillator when the output from said first filter exceeds a predetermined amplitude.

7. Apparatus according to claim 6 wherein said oscillator sweeps from a lower to a higher frequency, said second filter only passing signals from the upper end of the pass band of said first filter.

8. Apparatus according to claim 7 wherein both said filters are crystal filters.

9. Apparatus according to claim 8 wherein the heterodyne input to said first filter is a signal swept between approximately 8.7 and 12.7 megahertz, said first filter has a pass band of approximately 100 kilohertz and said second filter has a pass band of approximately 7.5 kilohertz.

10. Apparatus according to claim 9 wherein said first filter has a center frequency of 10.700 megahertz and said second filter has a center frequency of 10.745 megahertz.

11. Apparatus according to claim 1 wherein said integrator includes a capacitor, and said dump means includes a level detector for sensing the charge on said capacitor.

References Cited

UNITED STATES PATENTS

| | | | |
|---|---|---|---|
| 2,896,070 | 7/1959 | Fremont et al. | 325—31 |
| 3,110,861 | 11/1963 | Hurvitz | 325—335 |
| 3,403,341 | 9/1968 | Munch | 325—304 |
| 2,901,601 | 8/1959 | Richardson et al. | 325—474 |
| 3,014,127 | 12/1961 | Vlasak | 325—474 |
| 3,015,026 | 12/1961 | Milton et al. | 325—473 |
| 3,103,554 | 9/1963 | Avins et al. | 178—5.8 |

OTHER REFERENCES

Radio Amateur Handbook, A Transistorized Q Multiplier, 1960, pp. 141—142.

ROBERT L. GRIFFIN, Primary Examiner

A. J. MAYER, Assistant Examiner

U.S. Cl. X.R.

325—473, 474

PO-1050
(5/69)

UNITED STATES PATENT OFFICE
CERTIFICATE OF CORRECTION

Patent No. 3,534,265 Dated October 13, 1970

Inventor(s) STEPHEN A. MIXSELL ET AL

It is certified that error appears in the above-identified patent and that said Letters Patent are hereby corrected as shown below:

Column 1, line 43, after "ARB", insert -- . --; line 64, "is" (first occurrence) should read -- his --.

Column 2, line 57, "dstinguishing" should read -- distinguishing --. Column 3, line 69, "provide" should read -- provides --. Column 4, line 35, "-100" should read -- -110 --. Column 5, line 41, "frequnecies" should read -- frequencies --. Column 7, lines 40 and 46, "suffiicently" should read -- sufficiently --; line 70, "sttations" should read -- stations -- Column 9, line 5, "3" should read -- 1 --

Signed and sealed this 4th day of May 1971.

(SEAL)
Attest:

EDWARD M.FLETCHER,JR.
Attesting Officer

WILLIAM E. SCHUYLER, JR.
Commissioner of Patents